(12) United States Patent
Bookbinder et al.

(10) Patent No.: US 7,676,129 B1
(45) Date of Patent: Mar. 9, 2010

(54) BEND-INSENSITIVE FIBER WITH TWO-SEGMENT CORE

(75) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/273,203

(22) Filed: Nov. 18, 2008

(51) Int. Cl.
*G02B 6/02* (2006.01)

(52) U.S. Cl. ............... 385/123; 385/124; 385/126; 385/127

(58) Field of Classification Search .......... 385/123–128
See application file for complete search history.

(56) References Cited

U.S. PATENT DOCUMENTS

| | | | | |
|---|---|---|---|---|
| 4,715,679 A | 12/1987 | Bhagavatula | ............... | 350/96.33 |
| 4,852,968 A | 8/1989 | Reed | ............... | 350/96.33 |
| 6,266,467 B1 | 7/2001 | Kato et al. | ............... | 385/123 |
| 6,317,551 B1 | 11/2001 | Mitchell et al. | ............... | 385/127 |
| 6,337,942 B1 | 1/2002 | Kato et al. | ............... | 385/127 |
| 6,483,975 B1 | 11/2002 | Hsu et al. | ............... | 385/123 |
| 6,789,960 B2 * | 9/2004 | Bickham et al. | ............... | 385/96 |
| 6,901,196 B2 | 5/2005 | Takahashi et al. | ............... | 385/124 |
| 6,904,218 B2 | 6/2005 | Sun et al. | ............... | 385/127 |
| 7,046,891 B2 * | 5/2006 | Mishra et al. | ............... | 385/127 |
| 7,099,545 B2 | 8/2006 | Sako et al. | ............... | 385/127 |
| 7,164,835 B2 | 1/2007 | Matsuo et al. | ............... | 385/127 |
| 7,187,833 B2 | 3/2007 | Mishra | ............... | 385/127 |
| 7,221,838 B2 | 5/2007 | Jakobsen et al. | ............... | 385/123 |
| 7,254,305 B2 | 8/2007 | Mishra | ............... | 385/127 |
| 7,272,289 B2 | 9/2007 | Bickham et al. | ............... | 385/128 |
| 7,366,387 B2 | 4/2008 | Matsuo et al. | ............... | 385/123 |
| 7,440,663 B2 | 10/2008 | Matsuo et al. | ............... | 385/123 |
| 7,450,807 B2 * | 11/2008 | Bickham et al. | ............... | 385/126 |
| 7,526,169 B2 * | 4/2009 | Bickham et al. | ............... | 385/127 |
| 2003/0063875 A1 * | 4/2003 | Bickham et al. | ............... | 385/98 |
| 2006/0013548 A1 * | 1/2006 | Mishra et al. | ............... | 385/127 |
| 2006/0039665 A1 | 2/2006 | Matsuo et al. | ............... | 385/127 |
| 2007/0127878 A1 | 6/2007 | Demontmorillon et al. | . | 385/124 |
| 2007/0280615 A1 * | 12/2007 | de Montmorillon et al. | . | 385/124 |
| 2008/0050086 A1 * | 2/2008 | Bickham et al. | ............... | 385/142 |
| 2008/0056654 A1 * | 3/2008 | Bickham et al. | ............... | 385/124 |
| 2008/0056658 A1 * | 3/2008 | Bickham et al. | ............... | 385/127 |
| 2008/0101755 A1 | 5/2008 | Matsuo et al. | ............... | 385/127 |
| 2008/0124028 A1 * | 5/2008 | Bickham et al. | ............... | 385/55 |
| 2008/0152288 A1 | 6/2008 | Flammer et al. | ............... | 385/124 |
| 2008/0226241 A1 | 9/2008 | Sugizaki et al. | ............... | 385/114 |
| 2008/0279515 A1 * | 11/2008 | Bickham et al. | ............... | 385/123 |
| 2008/0304800 A1 * | 12/2008 | Bickham et al. | ............... | 385/127 |
| 2009/0148113 A1 * | 6/2009 | Bickham et al. | ............... | 385/127 |

OTHER PUBLICATIONS

Jeunhomme, Luc B., "Principles and Applications", Single-Mode Fiber Optics, Second Edition, 1990, pp. 39-44.
Himeno, Kuniharu, et al., "Low-Bending-Loss Single-Mode Fibers for Fiber-to-the-Home", Journal of Lightwave Technology, vol. 23, No. 11, Nov. 2005, pp. 3494-3499.

* cited by examiner

*Primary Examiner*—Akm E Ullah
(74) *Attorney, Agent, or Firm*—Matthew J. Mason

(57) ABSTRACT

Optical waveguide fiber that is bend resistant and single mode at 1260 nm and at higher wavelengths. The optical fiber includes a core with a central core region and an annular core region or, alternatively, a high index core region and a low index core region. The optical fiber also includes a cladding with an annular ring region and an annular outer region.

22 Claims, 7 Drawing Sheets

BEND-INSENSITIVE FIBER WITH TWO-SEGMENT CORE

BACKGROUND OF THE INVENTION

1. Field of the Invention

The present invention relates generally to optical fiber, and particularly to bend resistant single moded optical fibers.

2. Technical Background

Optical fibers utilized in so-called "access" and fiber to the premises (FTTx) optical networks can be subjected to a variety of bending environments. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution of cables with Factory Installed Termination Systems (FITS) and slack loops, small bend radius multiports located in cabinets that connect feeder and distribution cables, and jumpers in Network Access Points between distribution and drop cables.

SUMMARY OF THE INVENTION

One aspect of the invention is an optical fiber that includes a core and a cladding surrounding and in contact with the core. The core includes a central core region extending from a centerline to a radius $R_C$ and an annular core region surrounding and in contact with the central core region extending from $R_C$ to a radius $R_3$. The cladding includes an annular ring region extending from $R_3$ to a radius $R_4$, the annular ring region comprising a radial width, $W=R_4-R_3$, and an annular outer region extending from $R_4$ to an outermost glass radius $R_5$. The central core region includes a maximum relative refractive index, percent, $\Delta_{1MAX}$, and the annular ring region includes a minimum relative refractive index percent, $\Delta_{3MIN}$, wherein $0.30\% \leq \Delta_{1MAX} < 0.45\%$, $\Delta_{3MIN} \leq -0.2\%$, $W \geq 2$ µm, and $R_C/R_3 \geq 0.5$. The core and the cladding provide a cabled cutoff wavelength of less than 1260 nm, a zero dispersion wavelength between 1300 and 1324 nm, a mode field diameter at 1310 nm of between 8.20 and 9.50 µm, a dispersion slope at the zero dispersion wavelength of less than 0.092 ps/nm²-km, and a 5 mm diameter bend loss of less than 1.0 dB/turn.

In another aspect, the present invention includes an optical fiber that includes a core and a cladding surrounding and in contact with the core. The core includes a high index core region extending from a centerline to a radius $R_1$ and a low index core region surrounding and in contact with the central core region extending from $R_1$ to a radius $R_3$, the low index core region having a radial width of $R_3-R_1$. The cladding includes an annular ring region extending from $R_3$ to a radius $R_4$, the annular ring region comprising a radial width, $W=R_4-R_3$, and an annular outer region extending from $R_4$ to an outermost glass radius $R_5$. The high index core region has a relative refractive index profile, $\Delta_1(r)$, and includes a maximum relative refractive index percent, $\Delta_{1MAX}$, wherein $0.30\% \leq \Delta_{1MAX} < 0.45\%$ and $3.0$ µm $\leq R_1 \leq 4.5$ µm. The low index core region has a relative refractive index profile, $\Delta_2(r)$, and includes a maximum relative refractive index percent, $\Delta_{2MAX}$, wherein $0.06\% \leq \Delta_{2MAX} \leq 0.15\%$. The annular ring region includes a minimum relative refractive index $\Delta_{3MIN}$, wherein $\Delta_{3MIN} \leq -0.2\%$, and $W \geq 2$ µm. The core and the cladding provide a cabled cutoff wavelength of less than 1260 nm, a zero dispersion wavelength between 1300 and 1324 nm, a mode field diameter at 1310 nm of between 8.20 and 9.50 µm, a dispersion slope at the zero dispersion wavelength of less than 0.092 ps/nm²-km, and a 5 mm diameter bend loss of less than 1.0 dB/turn.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
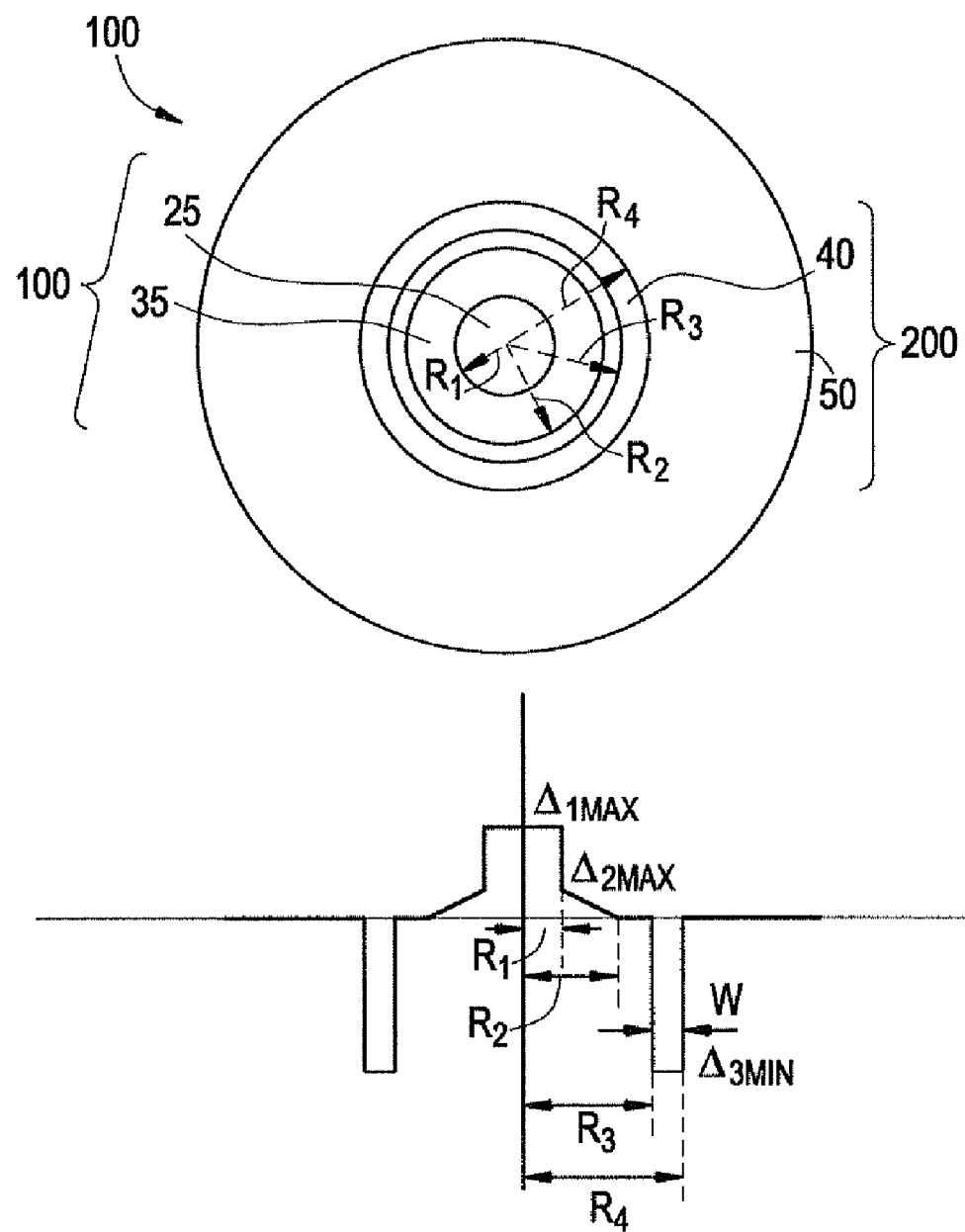
FIG. 1 schematically illustrates a cross-section of an optical waveguide fiber according to an embodiment as disclosed herein.

Reference will now be made in detail to the present preferred embodiments of the invention, examples of which are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the annular outer region of the cladding. As used herein, the relative refractive index is represented by $\Delta$ and its values are given in units of "%", unless otherwise specified. In cases where the refractive index of a region is less than the average refractive index of the annular outer region, the relative index percent is negative and is referred to as having a depressed region or depressed index, and the minimum relative refractive index is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$ (examples of updopants include $GeO_2$, $P_2O_5$, and $Al_2O_3$). A "downdopant" is herein considered to be a dopant which has a propensity to lower the refractive index relative to pure undoped $SiO_2$ (examples of downdopants include F and $B_2O_3$). An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

The mode field diameter (MFD) is measured using the Peterman II method wherein, $2w=MFD$, and $w^2 = (2\int f^2 r \, dr / \int [df/dr]^2 r \, dr)$, the integral limits being 0 to $\infty$.

The bend resistance of a waveguide fiber can be gauged by induced attenuation under prescribed test conditions, for example, by deploying or wrapping the fiber around a mandrel of a prescribed diameter. The attenuation induced by the wrapping about the mandrel is typically expressed in dB.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170". By cable cutoff as used herein, we mean the value obtained using the approximated test.

Unless otherwise noted herein, optical properties (such as dispersion, dispersion slope, etc.) are reported for the LP01 mode. Unless otherwise noted herein, a wavelength of 1550 nm is the reference wavelength.

Referring to FIG. 1, the optical fiber 10 disclosed herein comprises a core 100 and a cladding layer (or cladding) 200 surrounding and directly adjacent the core. In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

In some embodiments, the refractive index profile of the optical fiber disclosed herein is non-negative from the centerline to the outermost radius of the core 100. In some embodiments, the optical fiber contains no index-decreasing dopants in the core.

Core 100 includes a central core region 20 extending from a centerline to a radius $R_C$ and an annular core region 30 surrounding and in contact with the central core region extending from $R_C$ to a radius $R_3$ (see FIGS. 3-6). Cladding 200 includes an annular ring region 40 extending from $R_3$ to a radius $R_4$, the annular ring region 40 comprising a radial width, $W = R_4 - R_3$; and an annular outer region 50 extending from $R_4$ to an outermost glass radius $R_5$. Central core region 20 has a maximum relative refractive index percent, $\Delta_{1MAX}$, and annular ring region 40 has a minimum relative refractive index percent, $\Delta_{3MIN}$. $R_C$ is defined to occur at the radius where the relative refractive index percent first reaches 0.04%. That is, central core region 20 ends and annular core region 30 starts where the relative refractive index first reaches 0.04% (going radially outward) at a radius $R_C$. $R_3$ is defined to occur at the radius where the relative refractive index percent first reaches -0.04%. That is, annular core region 30 ends and annular ring region 40 starts where the relative refractive index first reaches -0.04% (going radially outward) at a radius $R_3$. $R_4$ is defined to occur at the radius where the relative refractive index percent first reaches -0.04% going radially outward from $\Delta_{3MIN}$. That is, annular ring region 40 ends and annular outer region 50 starts where the relative refractive index first reaches -0.04% (going radially outward past $\Delta_{3MIN}$) at radius $R_4$. Preferably, $0.30\% \leq \Delta_{1MAX} < 0.45\%$, $\Delta_{3MIN} \leq -0.2\%$, $W \geq 2$ μm, and $R_C/R_3 \geq 0.5$. Preferably, 5 μm $\leq R_C \leq$ 10 μm and 8 μm $\leq R_3 \leq$ 15 μm.

In particularly preferred embodiments, $0.35\% \leq \Delta_{1MAX} < 0.40\%$. In particularly preferred embodiments, 5 μm $\leq R_C \leq$ 8 μm and 8 μm $\leq R_3 \leq$ 12 μm. In particularly preferred embodiments, $R_C/R_3 \geq 0.6$, such as $R_C/R_3 \geq 0.65$, and further such as $R_C/R_3 \geq 0.7$, and even further such as $R_C/R_3 \geq 0.75$.

Preferably, core 100 is a graded-index core, having a relative refractive index profile that decreases gradually from $\Delta_{1MAX}$ to $R_C$ and then continues to decrease gradually from $R_C$ to $R_3$. Preferably, the average rate of decrease of the refractive index profile is greater between $\Delta_{1MAX}$ and $R_C$ than it is between $R_C$ and $R_3$. Preferably, the greatest rate of decrease of the refractive index profile is between $R_C/2$ and $R_C$. In some embodiments, the refractive index of the core may have a centerline dip, wherein $\Delta_{1MAX}$ is located a small distance away from the centerline, but in other embodiments the refractive index of the core has no centerline dip, and $\Delta_{1MAX}$ is located at the centerline.

Alternatively, core 100 can be viewed as including a high index core region 25 and a low index core region 35 wherein the high index core region 25 has a relative refractive index profile, $\Delta_1(r)$, a maximum relative refractive index percent, $\Delta_{1MAX}$, and extends from a centerline to a radius $R_1$. The low index core region 35 has a relative refractive index profile, $\Delta_2(r)$, a maximum relative refractive index percent, $\Delta_{2MAX}$, and extends from $R_1$ to a radius $R_3$. $\Delta_{2MAX}$ is defined to occur where $|\Delta(r) \, dr|$ reaches a maximum value going radially outward from $\Delta_{1MAX}$. $\Delta_{2MAX}$ is less than $\Delta_{1MAX}$ and $R_1$ is defined to occur at the point at which $\Delta_1(r)$ % first reaches $\Delta_{2MAX}$ (going radially outward). That is, high index core region 25 ends and low index core region 35 starts where the relative refractive index first reaches $\Delta_{2MAX}$ (going radially outward) at a radius $R_1$. Low index core region 35 ends and annular ring region 40 starts where the relative refractive index first reaches −0.04% (going radially outward) at a radius $R_3$. Annular ring region 40 and annular outer region 50 are as described above. Preferably, $0.30\% \leq \Delta_{1MAX} < 0.45\%$, $0.06\% \leq \Delta_{2MAX} \leq 0.15\%$, $\Delta_{3MIN} \leq -0.2\%$, $3.0 \, \mu m \leq R_1 \leq 4.5 \, \mu m$, and $W \geq 2 \, \mu m$.

Preferably, $\Delta_1(r)$ decreases gradually from $\Delta_{1MAX}$ to $R_1$. Preferably, $\Delta_2(r)$ decreases gradually from $R_1$ to $R_3$. Preferably, the average rate of decrease of the refractive index profile is greater between $\Delta_{1MAX}$ and $R_1$ than it is between $R_1$ and $R_3$. That is, the average rate of decrease of the refractive index profile is preferably greater in high index core region 25 than in low index core region 35.

In preferred embodiments, the relative refractive index profile, $\Delta_1(r)$, of high index core region 25 corresponds to a first alpha profile and at least a portion of the relative refractive index profile, $\Delta_1(r)$, of low index core region 35 corresponds to a second alpha profile. For example, in preferred embodiments, at least 50% low index core region 35 has a relative refractive index profile that corresponds to second alpha profile, such as at least 60%, and further such as at least 70%, and even further such as at least 80%, and yet even further such as at least 90%, including 100%.

In preferred embodiments, high index core region 25 corresponds to first alpha profile:

$$\Delta_1(r) = \Delta_{1MAX}[1-(r/R_1)^{\alpha 1}] + \Delta_{2MAX}(r/R_1)^{\alpha 1}$$

wherein, as described above, $R_1$ is the point at which $\Delta_1(r)$ % first reaches $\Delta_{2MAX}$ (going radially outward), and r is in the range $0 \leq r \leq R_1$, where $\Delta$ is defined above, and $\alpha 1$ is an exponent which is a real number. Preferably, $\alpha 1 \geq 5$, such as $\alpha 1 \geq 10$.

In preferred embodiments, low index core region 35 corresponds to second alpha profile:

$$\Delta_2(r) = \Delta_{2MAX}[1-[(r-R_1)/(R_2-R_1)]^{\alpha 2}]$$

wherein, as described above, $R_1$ is the point at which $\Delta_1(r)$ % first reaches $\Delta_{2MAX}$ (going radially outward), $R_2$ is the point at which $\Delta_2(r)$ reaches zero, and r is in the range $R_1 \leq r \leq R_2$, where $\Delta$ is defined above, and $\alpha 2$ is an exponent which is a real number. Preferably, $0.1 \leq \alpha 2 \leq 2$, such as $0.1 \leq \alpha 2 \leq 1$, and further such as $1 \leq \alpha 2 \leq 2$.

Figure 3:
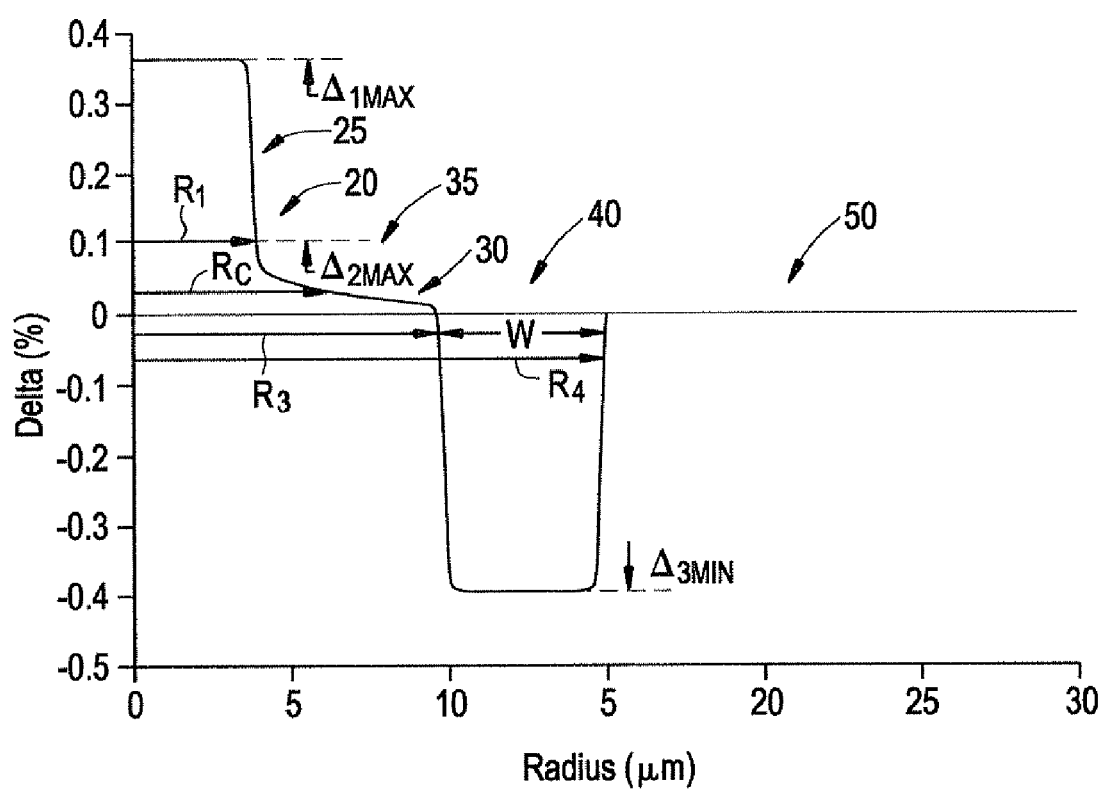
FIG. 3 schematically shows a relative refractive index profile of another embodiment of an optical waveguide fiber as disclosed herein.
Figure 5:
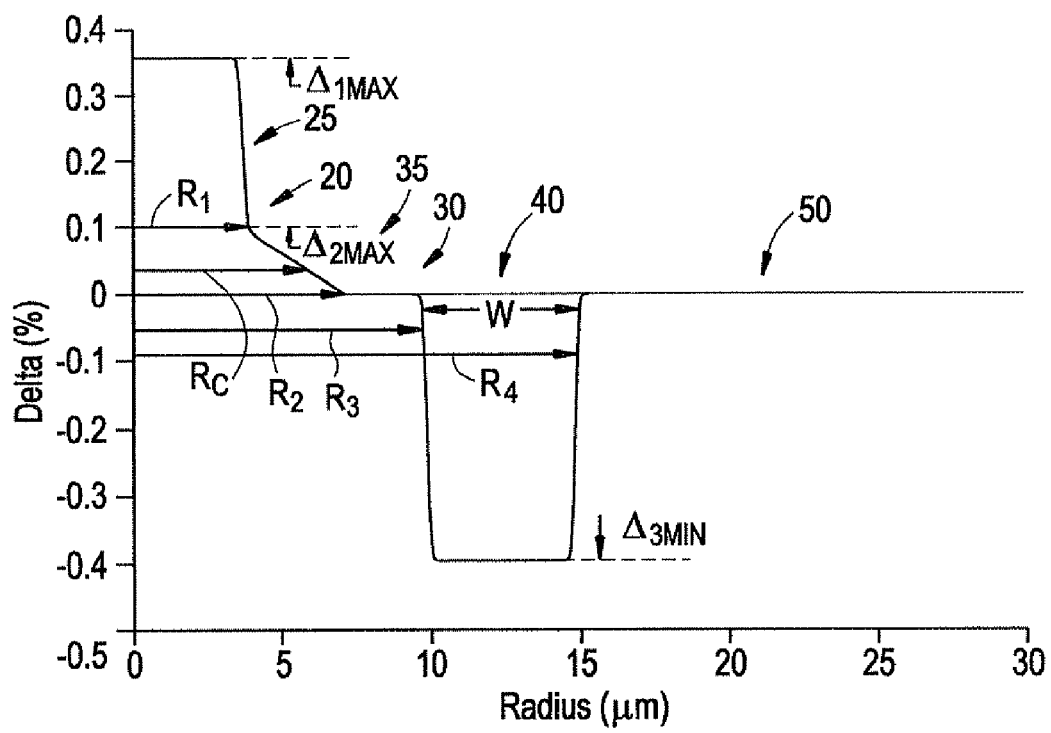
FIG. 5 schematically shows a relative refractive index profile of another embodiment of an optical waveguide fiber as disclosed herein.
Figure 6:
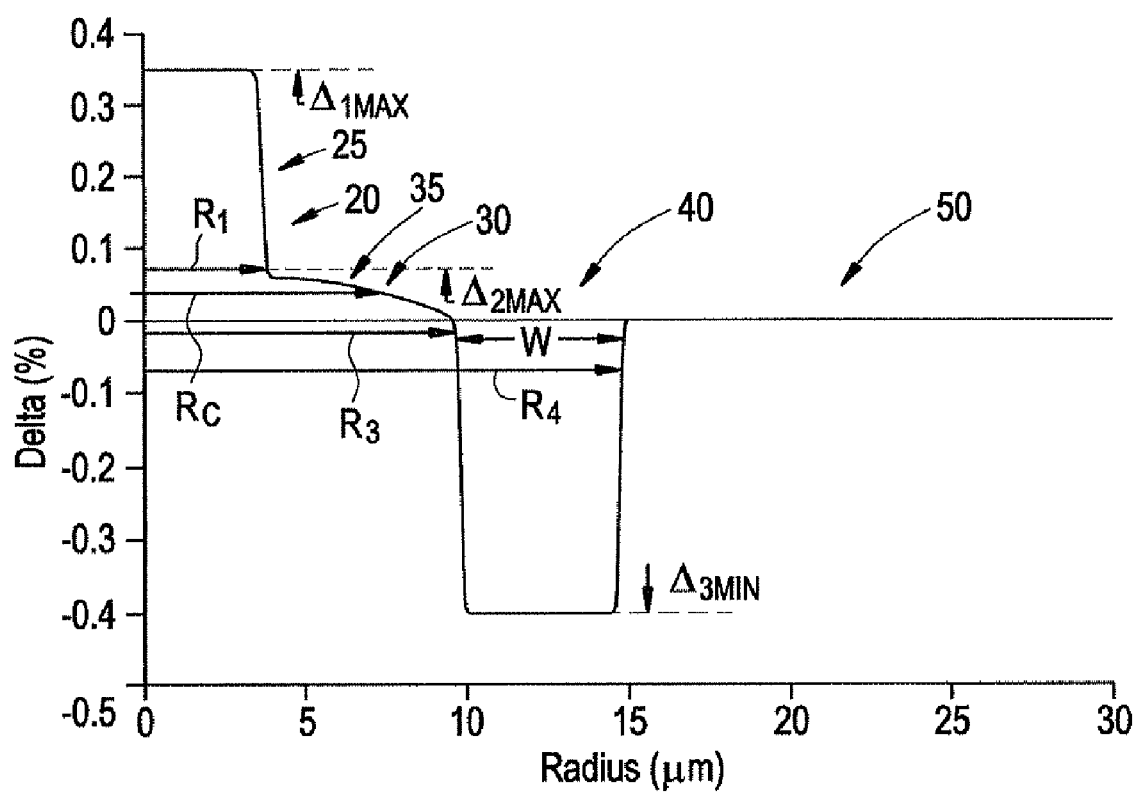
FIG. 6 schematically shows a relative refractive index profile of another embodiment of an optical waveguide fiber as disclosed herein.

Low index core region 35 can include embodiments where $R_2 < R_3$, $R_2 > R_3$, and $R_2 \approx R_3$. When $R_2 < R_3$, $\Delta_2(r)$, in preferred embodiments, corresponds to second alpha profile when r is in the range $R_1 \leq r \leq R_2$, and $\Delta_2(r)$ is at or near 0% when r is in the range $R_2 \leq r \leq R_3$, as shown in FIG. 5. When $R_2 \approx R_3$, $\Delta_2(r)$, in preferred embodiments, corresponds to second alpha profile over all or nearly the entire range of $R_1 \leq r \leq R_3$, as shown in FIG. 6. When $R_2 > R_3$, low index core region 35 is said to be truncated, as shown in FIG. 3. By truncated, it is meant that $\Delta_2(r)$ only corresponds to second alpha profile between $R_1$ and $R_3$ and does not correspond to second alpha profile going radially outward beyond $R_3$ (i.e., between $R_3$ and $R_2$). Preferably, $6 \, \mu m \leq R_2 \leq 15 \, \mu m$ and $8 \, \mu m \leq R_3 \leq 15 \, \mu m$.

In preferred embodiments, $\Delta_2(r)$ is at least 0.03% for at least 50% of the radial width of low index core region 35, such as at least 0.04% for at least 50% of the radial width of low index core region 35, and further such as at least 0.05% for at least 50% of the radial width of low index core region 35, and even further such as at least 0.06% for at least 50% of the radial width of low index core region 35, and yet even further such as at least 0.07% for at least 50% of the radial width of low index core region 35.

In particularly preferred embodiments, $3.5 \, \mu m \leq R_1 \leq 5 \, \mu m$, such as $3.5 \, \mu m \leq R_1 \leq 4 \, \mu m$, including $R_1=3.5 \, \mu m$, $R_1=3.6 \, \mu m$, $R_1=3.7 \, \mu m$, $R_1=3.8 \, \mu m$, $R_1=3.9 \, \mu m$, and $R_1=4.0 \, \mu m$. In particularly preferred embodiments, $0.30\% \leq \Delta_{1MAX} < 0.45\%$, such as $0.35\% \leq \Delta_{1MAX} < 0.40\%$. In particularly preferred embodiments, $0.05\% \leq \Delta 2_{MAX} \leq 0.15\%$, such as $0.10\% \leq \Delta 2_{MAX} \leq 0.15\%$, including $\Delta 2_{MAX}=0.10\%$, $\Delta 2_{MAX}=0.11\%$, $\Delta 2_{MAX}=0.12\%$, $\Delta 2_{MAX}=0.13\%$, $\Delta 2_{MAX}=0.14\%$, and $\Delta 2_{MAX}=0.15\%$. In particularly preferred embodiments, $R_2 < R_3$ and $6 \, \mu m \leq R_2 \leq 10 \, \mu m$ and $9 \, \mu m \leq R_3 \leq 15 \, \mu m$, such as $6 \, \mu m \leq R_2 \leq 8 \, \mu m$ and $10 \, \mu m \leq R_3 \leq 12 \, \mu m$. In additional particularly preferred embodiments, $R2 \approx R3$ and $8 \, \mu m \leq R_2, R_3) \leq 15 \, \mu m$, such as $9 \, \mu m \leq (R_2, R_3) \leq 12 \, \mu m$. In yet additional particularly preferred embodiments, $R_2 > R_3$ and $9 \, \mu m \leq R_2 \leq 15 \, \mu m$ and $8 \, \mu m \leq R_3 \leq 12 \, \mu m$, such as $10 \, \mu m \leq R_2 \leq 14 \, \mu m$ and $9 \, \mu m \leq R_3 \leq 11 \, \mu m$.

The annular ring region 40 has a profile volume, V, defined herein as:

$$2 \int_{R_3}^{R_4} \Delta_3(r) r \, dr$$

Preferably, $-2\% \leq \Delta_{3MIN} \leq -0.2\%$. Preferably, $2 \, \mu m \leq W \leq 10 \, \mu m$, such as $2 \, \mu m \leq W \leq 5 \, \mu m$. Preferably, $|V| \geq 20\%\text{-}\mu m^2$, such as $20\%\text{-}\mu m^2 \leq |V| \leq 100\%\text{-}\mu m^2$, and further such as $40\%\text{-}\mu m^2 \leq |V| \leq 80\%\text{-}\mu m^2$.

In one set of embodiments, annular ring region 40 comprises silica glass having at least one dopant selected from the group consisting of germanium, aluminum, phosphorus, titanium, boron, and fluorine, wherein the at least one dopant is preferably selected from at least one of boron and fluorine. In a particularly preferred embodiment, the at least one dopant is fluorine.

In another set of embodiments, annular ring region 40 comprises silica based glass (either pure silica, or silica doped with for example, germanium, aluminum, phosphorous, titanium, boron and fluorine) with a plurality of closed randomly dispersed voids, the voids being either empty (vacuum) or gas (e.g., argon, nitrogen, krypton, $SO_2$ or air). Such voids can provide an effective refractive index which is low, e.g., compared to pure silica. Preferably, annular ring region 40 contains at least 50 voids, more preferably at least 100 voids when viewed in cross section, even more preferably at least 200 voids, and still more preferably at least 400 voids. It is preferable that the mean distance between the voids is less than 5,000 nm, more preferably less than 2,000 nm, even more preferably less than 1,000 nm. Preferably, at least 80%, and more preferably at least 90% of the voids have a maximum cross-sectional diameter of less than 1,000 nm, preferably less than 500 nm. Even more preferably, the mean diameter of the voids is less than 1,000 nm, more preferably less than 500 nm, and even more preferably less than 300 nm. In a particularly preferred embodiment, the mean diameter of the voids is greater than 2 nm and less than 200 nm, such as greater than 2 nm and less than 100 nm.

Figure 2:
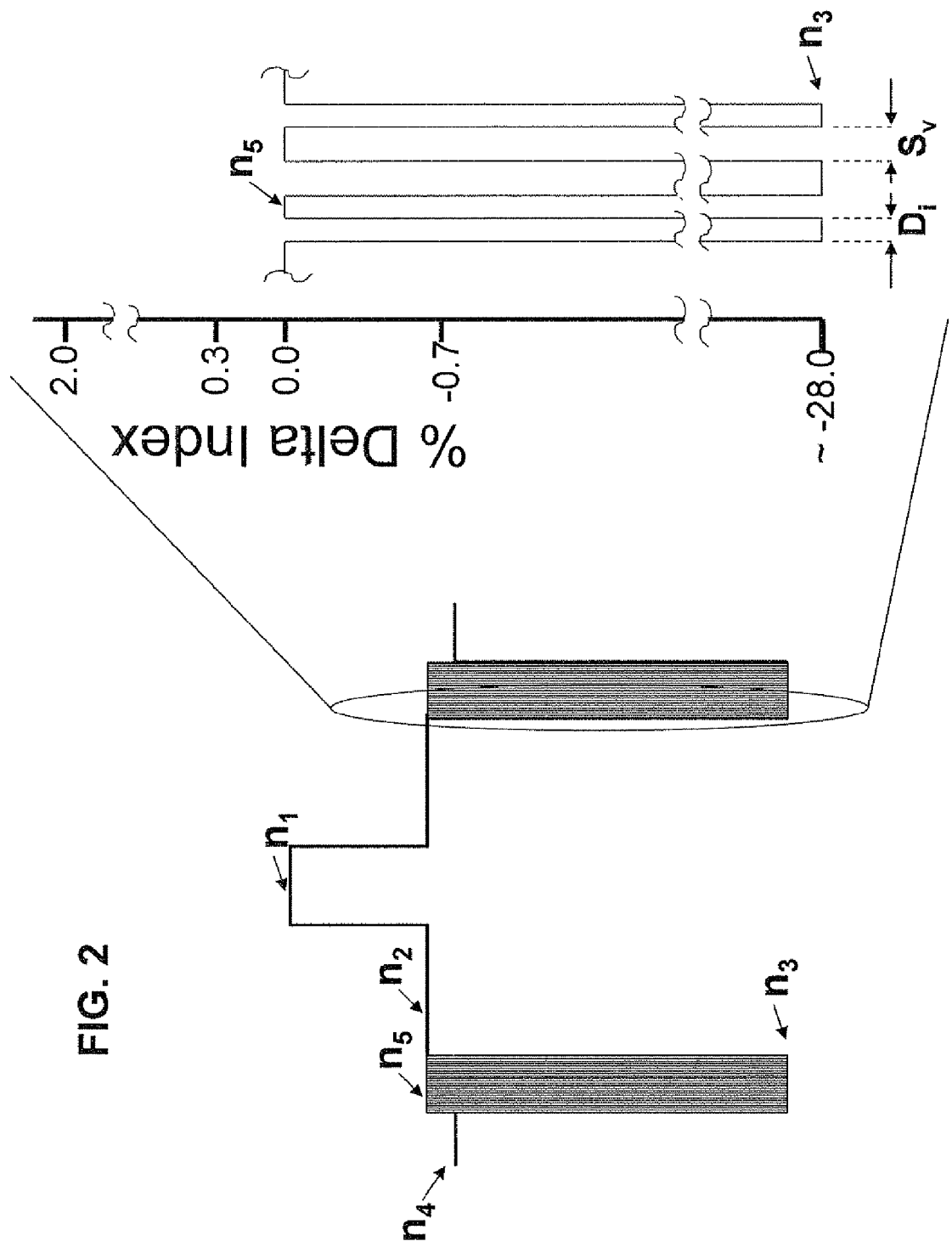
FIG. 2 schematically shows a relative refractive index profile of an embodiment of an optical waveguide fiber as disclosed herein.

FIG. 2 schematically illustrates a refractive index profile corresponding to an optical fiber having an annular ring region 40 that includes a plurality of closed randomly dispersed voids. This figure illustrates that the relative percent index of refraction in the annular ring region 40 fluctuates between $\Delta_3=-28\%$ (index of void filled gas relative to that of silica) and that of the glass surrounding the voids (i.e., about 0% when the glass surrounding the voids is pure, undoped silica).

EXAMPLES

Examples 1-15 set forth refractive index profiles and properties of modeled optical fibers in accordance with embodiments disclosed herein.

Table 1 lists characteristics of illustrative Examples 1-8. In these examples, high index core region has a relative refractive index profile, $\Delta_1(r)$, that corresponds to first alpha profile described above and low index core region has a relative refractive index profile $\Delta_2(r)$, that corresponds to second alpha profile described above, wherein $R_2>R_3$, meaning low index core region is truncated. FIG. 3 schematically shows a refractive index profile corresponding to Example 1.

TABLE 1

| | Example | | | | | | | |
|---|---|---|---|---|---|---|---|---|
| | 1 | 2 | 3 | 4 | 5 | 6 | 7 | 8 |
| $\Delta_{1MAX}$ (%) | 0.36 | 0.36 | 0.36 | 0.36 | 0.36 | 0.36 | 0.36 | 0.36 |
| $R_1$ (μm) | 3.8 | 3.8 | 3.8 | 3.8 | 3.8 | 3.8 | 3.8 | 3.8 |
| $\Delta_{2MAX}$ (%) | 0.1 | 0.1 | 0.1 | 0.1 | 0.1 | 0.1 | 0.15 | 0.15 |
| $R_2$ (μm) | 12 | 12 | 12 | 12 | 12 | 12 | 12 | 12 |
| α2 | 0.3 | 0.3 | 0.3 | 0.3 | 0.3 | 0.3 | 0.3 | 0.3 |
| $R_C$ (μm) | 5.7 | 5.7 | 5.7 | 5.7 | 5.7 | 5.7 | 5.7 | 5.7 |
| $\Delta_{3MIN}$ (%) | −0.4 | −0.3 | −0.2 | −0.7 | −1.0 | −1.3 | −0.4 | −1.3 |
| $R_3$ (μm) | 9.95 | 9.62 | 9.15 | 10.4 | 10.6 | 10.8 | 10.5 | 11.3 |
| W (μm) | 5 | 6.5 | 9.1 | 2.95 | 2.1 | 3.0 | 4.5 | 2.5 |
| V (%-μm²) | −49.8 | −50.2 | −49.9 | −49.0 | −48.9 | −95.9 | −45.9 | −81.6 |
| $R_C/R_3$ | 0.67 | 0.67 | 0.67 | 0.67 | 0.67 | 0.67 | 0.67 | 0.67 |
| MFD at 1310 nm (μm) | 8.9 | 8.9 | 8.9 | 8.9 | 8.9 | 8.9 | 9.1 | 9.1 |
| Lambda zero (nm) | 1312 | 1312 | 1312 | 1312 | 1312 | 1312 | 1312 | 1312 |
| Slope (ps/nm²/km) at lambda zero | 0.0904 | 0.0899 | 0.0895 | 0.0902 | 0.0904 | 0.0906 | 0.0901 | 0.0906 |
| MFD at 1550 nm (μm) | 10.1 | 10.0 | 10.0 | 10.0 | 10.0 | 10.0 | 10.2 | 10.2 |

Figure 4:
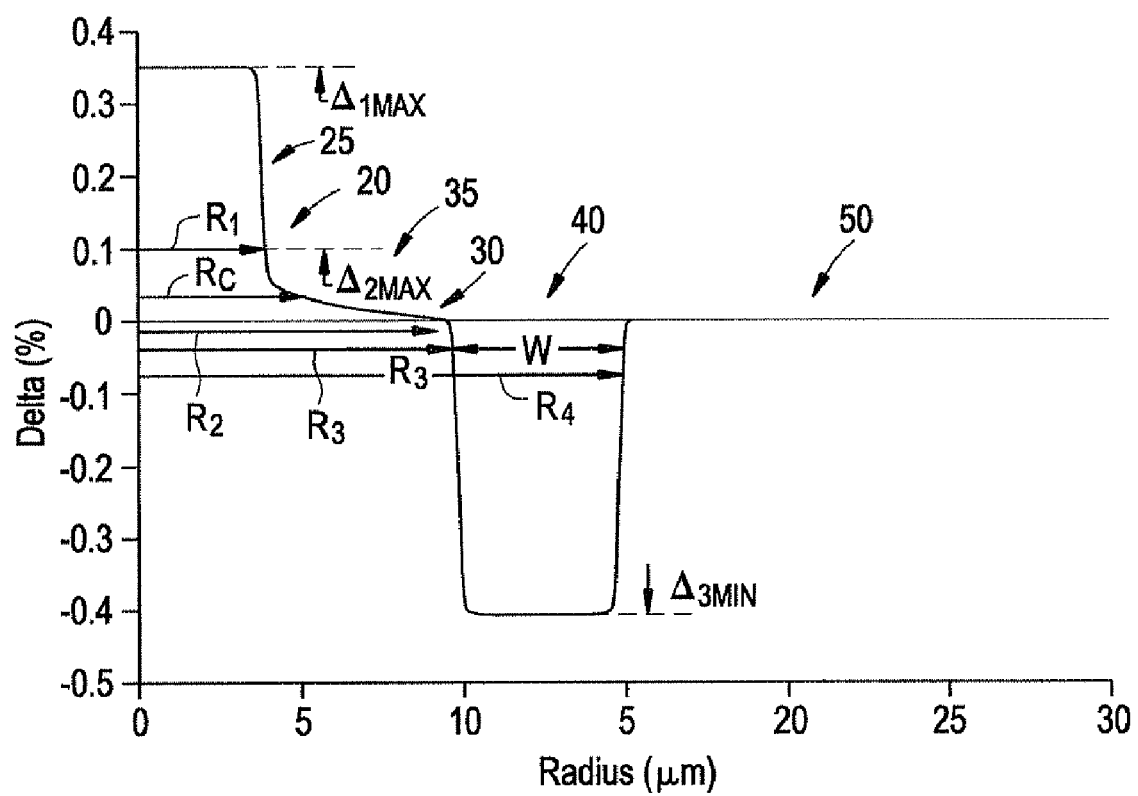
FIG. 4 schematically shows a relative refractive index profile of another embodiment of an optical waveguide fiber as disclosed herein.

Table 2 lists characteristics of illustrative Examples 9-1. In these examples, high index core region has a relative refractive index profile, $\Delta_1(r)$, that corresponds to first alpha profile described above and low index core region has a relative refractive index profile $\Delta_2(r)$, a portion of which corresponds to second alpha profile described above, wherein $R_2<R_3$, such that $\Delta_2(r)$ is 0% between $R_2$ and $R_3$. FIG. 4 schematically shows a refractive index profile corresponding to Example 9 and FIG. 5 schematically shows a refractive index profile corresponding to Example 11.

TABLE 2

| Example | 9 | 10 | 11 |
|---|---|---|---|
| $\Delta_{1MAX}$ (%) | 0.36 | 0.34 | 0.36 |
| $R_1$ (μm) | 3.9 | 3.9 | 3.69 |
| $\Delta_{2MAX}$ (%) | 0.1 | 0.1 | 0.1 |
| $R_2$ (μm) | 9.95 | 9.95 | 7 |
| α2 | 0.3 | 0.3 | 1 |
| $R_C$ (μm) | 5.3 | 5.4 | 5.8 |
| $\Delta_{3MIN}$ (%) | −0.4 | −0.4 | −0.4 |
| $R_3$ (μm) | 10.9 | 10.8 | 9.8 |
| W (μm) | 4 | 4 | 5 |
| V (%-μm²) | −41.3 | −50.2 | −49.2 |
| $R_C/R_3$ | 0.49 | 0.50 | 0.59 |
| MFD at 1310 nm (μm) | 9.0 | 8.9 | 8.9 |
| Lambda zero (nm) | 1312 | 1312 | 1310 |
| Slope (ps/nm²/km) at lambda zero | 0.0888 | 0.0899 | 0.0912 |
| MFD at 1550 nm (μm) | 10.2 | 10.0 | 10.0 |

Table 3 lists characteristics of illustrative Example 12. In this example, high index core region has a relative refractive index profile, $\Delta_1(r)$, that corresponds to first alpha profile described above and low index core region has a relative refractive index profile $\Delta_2(r)$, that corresponds to second alpha profile described above, wherein $R_2=R_3$. FIG. 6 schematically shows a refractive index profile corresponding to Example 12.

TABLE 3

| Example | 12 |
|---|---|
| $\Delta_{1MAX}$ (%) | 0.35 |
| $R_1$ (μm) | 3.67 |
| $\Delta_{2MAX}$ (%) | 0.06 |
| $R_2$ (μm) | 9.8 |
| α2 | 2 |
| $R_C$ (μm) | 7.6 |
| $\Delta_{3MIN}$ (%) | −0.4 |
| $R_3$ (μm) | 9.8 |
| W (μm) | 5 |
| V (%-μm²) | −49.2 |
| $R_C/R_3$ | 0.78 |
| MFD at 1310 nm (μm) | 9.1 |

TABLE 3-continued

| Example | 12 |
|---|---|
| Lambda zero (nm) | 1318 |
| Slope (ps/nm²/km) at lambda zero | 0.0909 |
| MFD at 1550 nm (μm) | 10.3 |

Table 4 lists characteristics of illustrative Examples 13-15. In these examples, high index core region has a relative refractive index profile, $\Delta_1(r)$, that corresponds to first alpha profile described above and low index core region has a relative refractive index profile $\Delta_2(r)$, that corresponds to second alpha profile described above, wherein $\alpha 2=0.5$.

TABLE 4

| Example | 13 | 14 | 15 |
|---|---|---|---|
| $\Delta_{1MAX}$(%) | 0.35 | 0.30 | 0.4 |
| $R_1$ (μm) | 4 | 4.2 | 3.3 |
| $\Delta_{2MAX}$(%) | 0.06 | 0.06 | 0.15 |
| $R_2$ (μm) | 9.8 | 11.3 | 9.8 |
| $\alpha 2$ | 0.5 | 0.5 | 0.5 |
| $R_C$ (μm) | 5.0 | 5.6 | 6.8 |
| $\Delta_{3MIN}$(%) | −0.4 | −0.4 | −0.4 |
| $R_3$ (μm) | 9.3 | 11.3 | 8.05 |
| W (μm) | 5 | 4 | 4.5 |
| V (%-μm²) | −47.2 | −42.6 | −37.1 |
| $R_C/R_3$ | 0.54 | 0.50 | 0.84 |
| MFD at 1310 nm (μm) | 9.0 | 9.7 | 8.5 |
| Lambda zero (nm) | 1302 | 1305 | 1315 |
| Slope (ps/nm²/km) at lambda zero | 0.0927 | 0.0913 | 0.093 |
| MFD at 1550 nm (μm) | 10.1 | 11.0 | 9.5 |

In each of Examples 1-15, the modeled optical fiber exhibits a cabled cutoff wavelength of less than 1260 nm, a zero dispersion wavelength between 1300 and 1324 nm, a mode field diameter at 1310 nm of between 8.20 and 9.50 μm, and a dispersion slope at the zero dispersion wavelength of less than 0.092 ps/nm²-km.

The optical fibers disclosed herein exhibit superior bend resistance, both macrobend and microbend, such as Examples 1-15 where the modeled optical fiber is expected to exhibit a bend loss of less than 1.0 dB/turn around a 10 mm diameter mandrel, such as a bend loss of less than 0.5 dB/turn around a 10 mm diameter mandrel. Such optical fiber is expected to exhibit a bend loss of less than 0.2 dB/turn around a 15 mm diameter mandrel and a bend loss of less than 0.1 dB/turn around a 20 mm diameter mandrel.

Figure 7:
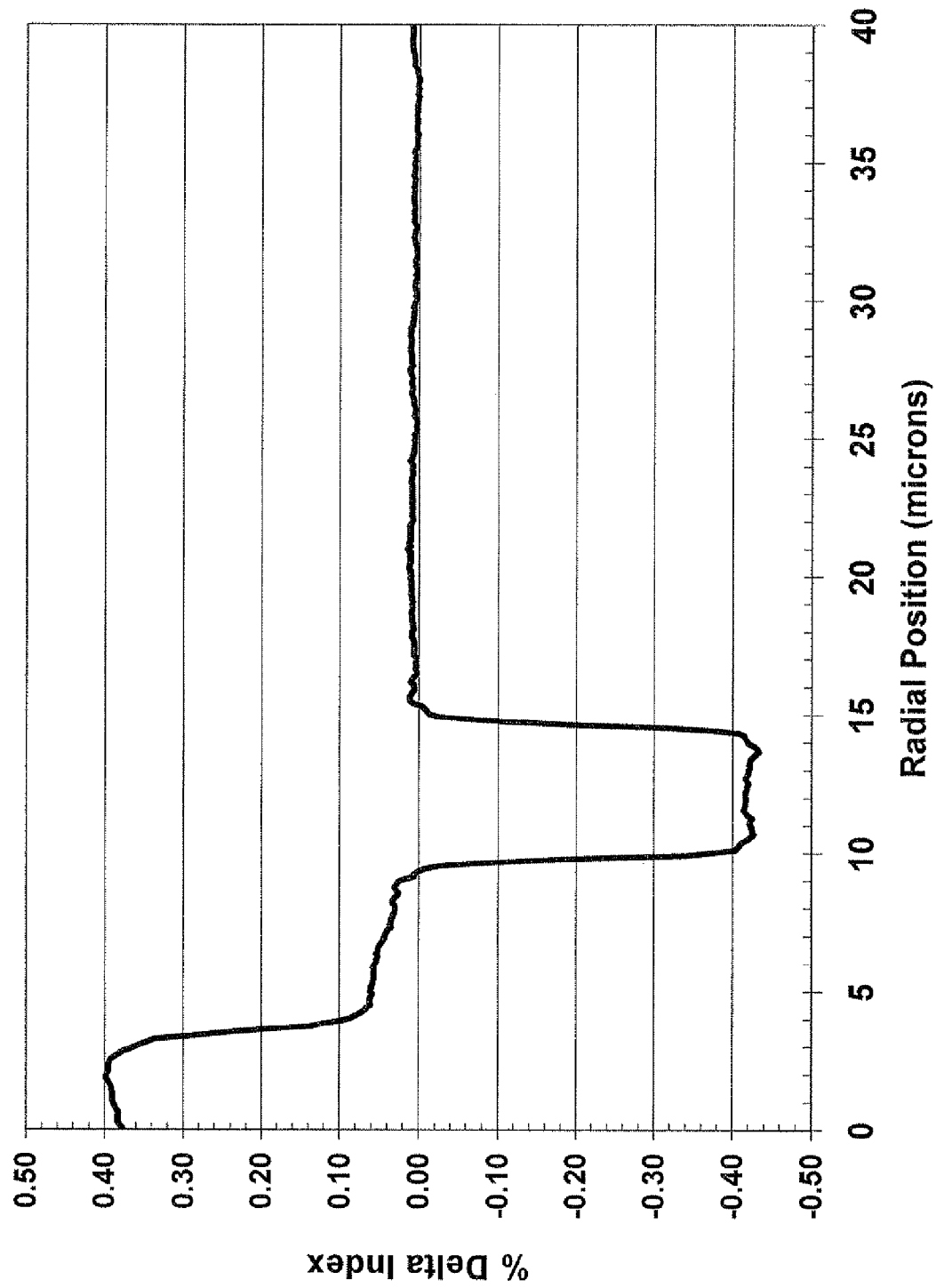
FIG. 7 shows a measured relative refractive index profile of another embodiment of an optical waveguide fiber as disclosed herein.

Example 16 sets forth refractive index profiles and properties of optical fiber made in accordance with embodiments disclosed herein. The optical fiber was a single mode 125 mm diameter fiber with a fluorine doped annular ring region. Table 5 lists characteristics of illustrative Example 16 and FIG. 7 shows a measured relative refractive index profile of illustrative Example 16.

TABLE 5

| Example | 16 |
|---|---|
| $\Delta_{1MAX}$(%) | 0.4 |
| $R_1$ (μm) | 4.0 |
| $\Delta_{2MAX}$(%) | 0.07 |
| $R_2$ (μm) | 12.5 |
| $\alpha 2$ | 0.5 |
| $R_C$ (μm) | 7.6 |
| $\Delta_{3MIN}$(%) | −0.43 |
| $R_3$ (μm) | 9.5 |
| W (μm) | 5.4 |
| V (%-μm²) | −50.1 |
| $R_C/R_3$ | 0.80 |
| MFD at 1310 nm (μm) | 8.80 |
| Lambda zero (nm) | 1317 |
| Slope (ps/nm²/km) at lambda zero | 0.089 |
| MFD at 1550 nm (μm) | 9.95 |
| Attenuation at 1550 nm (dB/km) | 0.192 |
| Bend loss (10 mm diameter mandrel) at 1550 nm (dB/turn) | 0.21 |
| Bend loss (15 mm diameter mandrel) at 1550 nm (dB/turn) | 0.05 |
| Bend loss (20 mm diameter mandrel) at 1550 nm (dB/turn) | 0.03 |

Optical fiber disclosed herein can be optically connected with a second optical fiber such as by a fusion splice. When annular ring region 40 of optical fiber disclosed herein comprises silica based glass (either pure silica, or silica doped with for example, germanium, aluminum, phosphorous, titanium, boron and/or fluorine) with a plurality of closed randomly dispersed voids, the mode field diameter changes due to collapse of the voids during the fusion splicing process are much less than otherwise similar fibers with a simple step index core. Table 6 compares the expected mode field diameter changes at 1310, 1550 and 1625 μm subsequent to fusion splicing for the fiber of Example 6 and an otherwise similar optical fiber having a simple step index core. As can be seen from Table 6, the mode field diameter change of the optical fiber of Example 6 subsequent to splicing is less than 0.4 μm for all wavelengths between 1310 nm and 1625 nm.

TABLE 6

| | 1310 nm | 1550 nm | 1625 nm |
|---|---|---|---|
| MFD change (μm) Fiber with simple step core | 0.20 | 0.67 | 0.92 |
| MFD change (μm) Fiber of Example 6 | 0.06 | 0.26 | 0.38 |

Preferably, the optical fiber disclosed herein has a silica-based core and cladding. In preferred embodiments, the cladding has an outer diameter, 2*Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably, the coating has a constant diameter, radially and along the length of the fiber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   a core comprising:
      a central core region extending from a centerline to a radius $R_C$; and
      an annular core region surrounding and in contact with the central core region extending from $R_C$ to a radius $R_3$; and
   a cladding surrounding and in contact with the core comprising:
      an annular ring region extending from $R_3$ to a radius $R_4$, the annular ring region comprising a radial width, $W=R_4-R_3$; and
      an annular outer region extending from $R_4$ to an outermost glass radius $R_5$;
   wherein the central core region comprises a maximum relative refractive index, percent, $\Delta_{1MAX}$;
   the annular ring region comprises a minimum relative refractive index percent, $\Delta_{3MIN}$;
   wherein $0.30\% \leq \Delta_{1MAX} < 0.45\%$, $\Delta_{3MIN} \leq -0.2\%$, $W \geq 2$ µm, and $R_C/R_3 \geq 0.5$;
   and wherein the core and the cladding provide a cabled cutoff wavelength of less than 1260 nm, a zero dispersion wavelength between 1300 and 1324 nm, a mode field diameter at 1310 nm of between 8.20 and 9.50 µm, a dispersion slope at the zero dispersion wavelength of less than 0.092 ps/nm²-km, and a 10 mm diameter bend loss of less than 1.0 dB/turn.

2. The optical fiber of claim 1 wherein $5 \text{ µm} \leq R_C \leq 10 \text{ µm}$.

3. The optical fiber of claim 1 wherein $8 \text{ µm} \leq R_3 \leq 15 \text{ µm}$.

4. The optical fiber of claim 1 wherein $R_C/R_3 \geq 0.6$.

5. The optical fiber of claim 1 wherein the annular ring region comprises a profile volume, V, equal to:

$$2 \int_{R_3}^{R_4} \Delta_3(r) r \, dr;$$

wherein $|V| \geq 20\%\text{-µm}^2$.

6. The optical fiber of claim 1 wherein said annular ring region comprises silica based glass with at least 50 closed randomly dispersed voids situated therein, and (i) the mean distance between the voids is less than 5,000 nm, and (ii) at least 80% of the voids have a maximum cross-sectional diameter of less than 1,000 nm.

7. The optical fiber of claim 1 wherein said annular ring region comprises fluorine.

8. The optical fiber of claim 6 wherein, subsequent to splicing to a second optical fiber, the mode field diameter change of the optical fiber is less than 0.4 µm for all wavelengths between 1310 nm and 1625 nm.

9. An optical fiber comprising:
   a core comprising:
      a high index core region extending from a centerline to a radius $R_1$; and
      a low index core region surrounding and in contact with the central core region extending from $R_1$ to a radius $R_3$, the low index core region comprising a radial width of $R_3-R_1$; and
   a cladding surrounding and in contact with the core comprising:
      an annular ring region extending from $R_3$ to a radius $R_4$, the annular ring region comprising a radial width, $W=R_4-R_3$; and
      an annular outer region extending from $R_4$ to an outermost glass radius $R_5$;
   wherein the high index core region has a relative refractive index profile, $\Delta_1(r)$, and comprises a maximum relative refractive index percent, $\Delta_{1MAX}$;
   the low index core region has a relative refractive index profile, $\Delta_2(r)$, and comprises a maximum relative refractive index percent, $\Delta_{2MAX}$;
   the annular ring region comprises a minimum relative refractive index $\Delta_{3MIN}$;
   wherein $0.30\% \leq \Delta_{1MAX} < 0.45\%$, $0.06\% \leq \Delta_{2MAX} \leq 0.15\%$, $\Delta_{3MIN} \leq -0.2\%$, $3.0 \text{ µm} \leq R_1 \leq 4.5 \text{ µm}$, and $W \geq 2 \text{ µm}$, and;
   and wherein the core and the cladding provide a cabled cutoff wavelength of less than 1260 nm, a zero dispersion wavelength between 1300 and 1324 nm, a mode field diameter at 1310 nm of between 8.20 and 9.50 µm, a dispersion slope at the zero dispersion wavelength of less than 0.092 ps/nm²-km, and a 10 mm diameter bend loss of less than 1.0 dB/turn.

10. The optical fiber of claim 9 wherein $8 \text{ µm} \leq R_3 \leq 15 \text{ µm}$.

11. The optical fiber of claim 9 wherein $0.10\% \leq \Delta 2_{MAX} \leq 0.15\%$.

12. The optical fiber of claim 9 wherein $3.5 \text{ µm} \leq R_1 \leq 4.0 \text{ µm}$.

13. The optical fiber of claim 9 wherein $\Delta_2(r)$ is at least 0.03% for at least 50% of the radial width of low index core region.

14. The optical fiber of claim 9 wherein:

$$\Delta_1(r) = \Delta_{1MAX}[1-(r/R_1)^{\alpha 1}] + \Delta_{2MAX}(r/R_1)^{\alpha 1}$$

wherein $0 \leq r \leq R_1$ and $\alpha 1 \geq 5$; and $$\Delta_2(r) = \Delta_{2MAX}[1-[(r-R_1)/(R_2-R_1)]^{\alpha 2}]$$

for at least 50% of the radial width of low index core region, wherein $R_1 \leq r \leq R_2$ and $0.1 \leq \alpha 2 \leq 2$.

15. The optical fiber of claim 14 wherein $6 \text{ µm} \leq R_2 \leq 15 \text{ µm}$.

16. The optical fiber of claim 15 wherein $R_2 < R_3$.

17. The optical fiber of claim 15 wherein $R_2 > R_3$.

18. The optical fiber of claim 9 wherein the annular ring region comprises a profile volume, A, equal to:

$$2 \int_{R_3}^{R_4} \Delta_3(r) r \, dr;$$

wherein $|V| \geq 20\%\text{-µm}^2$.

19. The optical fiber of claim 9 wherein said annular ring region comprises silica based glass with at least 50 closed randomly dispersed voids situated therein, and (i) the mean distance between the voids is less than 5,000 nm, and (ii) at least 80% of the voids have a maximum cross-sectional diameter of less than 1,000 nm.

20. The optical fiber of claim 19 wherein, subsequent to splicing to a second optical fiber, the mode field diameter change of the optical fiber is less than 0.4 μm for all wavelengths between 1310 nm and 1625 nm.

21. The optical fiber of claim 9 wherein said annular ring region comprises fluorine.

22. The optical fiber of claim 9 wherein $\Delta_2(r)$ is at least 0.06% for at least 50% of the radial width of low index core region.

* * * * *